[12] United States Patent
Kephart et al.

(10) Patent No.: US 8,359,112 B2
(45) Date of Patent: Jan. 22, 2013

(54) METHOD FOR REDUNDANT CONTROLLER SYNCHRONIZATION FOR BUMP-LESS FAILOVER DURING NORMAL AND PROGRAM MISMATCH CONDITIONS

(75) Inventors: Richard W. Kephart, Kittanning, PA (US); Kimberly Costlow, Pittsburgh, PA (US); Michael Durbin, Allison Park, PA (US); Xu Cheng, Pittsburgh, PA (US); Richard Brown, Murrysville, PA (US)

(73) Assignee: Emerson Process Management Power & Water Solutions, Inc., Pittsburgh, PA (US)

( * ) Notice: Subject to any disclaimer, the term of this patent is extended or adjusted under 35 U.S.C. 154(b) by 733 days.

(21) Appl. No.: 11/331,886

(22) Filed: Jan. 13, 2006

(65) Prior Publication Data

US 2007/0168058 A1  Jul. 19, 2007

(51) Int. Cl.
*G05B 9/02* (2006.01)
*G05B 11/01* (2006.01)
*G06F 11/00* (2006.01)
*G06F 17/00* (2006.01)
*G06F 7/00* (2006.01)
*G06F 19/00* (2011.01)

(52) U.S. Cl. ............... 700/82; 700/25; 714/6.1; 714/13; 714/31; 714/12

(58) Field of Classification Search .................... 700/82, 700/79; 714/6.1, 13, 31; 702/58, 59
See application file for complete search history.

(56) References Cited

U.S. PATENT DOCUMENTS 5,099,449 A * 3/1992 Dombrosky et al. ........... 710/58
5,777,874 A    7/1998 Flood et al.
5,933,347 A    8/1999 Cook et al.
(Continued)

FOREIGN PATENT DOCUMENTS

CN    101004587 A    7/2007
(Continued)

OTHER PUBLICATIONS

Combined Search and Examination Report for Application No. GB1106151.2, dated May 19, 2011.
(Continued)

*Primary Examiner* — Ryan Jarrett
*Assistant Examiner* — Darrin Dunn
(74) *Attorney, Agent, or Firm* — Marshall, Gerstein & Borun LLP

(57) ABSTRACT

The present invention relates generally to process control systems and devices and, more particularly, to an apparatus for and a method of implementing redundant controller synchronization for bump-less failover during normal and mismatch conditions at the redundant controllers. The redundant controllers are configured to transmit state information of the process control areas of the primary controller to the backup controller that is necessary for synchronizing the redundant controllers but is not typically transmitted to other devices during the performance of process control functions. Synchronization messages are transmitted from the primary controller to the backup controller each time one of the control areas executes to perform process control functions. In other aspects, the redundant controllers are configured to determine state information at the backup controller from other process control network information during a failover of the primary controller where a mismatch condition exists between the control areas of the two controllers during the downloading of reconfigurations, and to initialize the backup controller at startup when the mismatch condition exists.

34 Claims, 7 Drawing Sheets

U.S. PATENT DOCUMENTS

| | | | | |
|---|---|---|---|---|
| 5,966,300 | A * | 10/1999 | Flood et al. | 700/2 |
| 5,966,301 | A * | 10/1999 | Cook et al. | 700/3 |
| 6,058,054 | A * | 5/2000 | Islam et al. | 365/200 |
| 6,272,386 | B1 * | 8/2001 | McLaughlin et al. | 700/82 |
| 6,374,335 | B1 | 4/2002 | Barthel et al. | |
| 6,411,857 | B1 * | 6/2002 | Flood | 700/4 |
| 6,742,136 | B2 | 5/2004 | Christensen et al. | 714/5 |
| 7,168,075 | B1 | 1/2007 | Barthel et al. | |
| 7,558,687 | B1 * | 7/2009 | Bode | 702/83 |
| 7,562,250 | B2 * | 7/2009 | Wahl et al. | 714/6 |
| 2002/0184410 | A1 | 12/2002 | Apel et al. | 710/5 |
| 2003/0195934 | A1 | 10/2003 | Peterson et al. | 709/206 |
| 2004/0098140 | A1 * | 5/2004 | Hess | 700/3 |
| 2004/0153700 | A1 * | 8/2004 | Nixon et al. | 714/4 |
| 2006/0052985 | A1 * | 3/2006 | Ito et al. | 702/188 |
| 2006/0058899 | A1 * | 3/2006 | Boyden et al. | 700/44 |
| 2006/0111794 | A1 * | 5/2006 | Wysuph et al. | 700/19 |
| 2007/0168058 | A1 | 7/2007 | Kephart et al. | |

FOREIGN PATENT DOCUMENTS

| | | |
|---|---|---|
| DE | 10 2007 001 576 A1 | 9/2007 |
| GB | 2 434 229 | 7/2007 |
| WO | WO-99/32947 A1 | 7/1999 |
| WO | WO-00/62135 A1 | 10/2000 |
| WO | WO-01/37058 A1 | 5/2001 |
| WO | WO-2006/033880 A1 | 3/2006 |
| WO | WO-2006/083723 A1 | 8/2006 |

OTHER PUBLICATIONS

Examination Report for Application No. GB0700569.7, dated Jul. 12, 2010.
First Chinese Office Action for Application No. 200710000848.4, dated Oct. 9, 2009.
Search Report for Application No. GB0700569,7, dated May 9, 2007.
Combined Search and Examination Report for Application No. GB1106153.8, dated May 19, 2011.

* cited by examiner

METHOD FOR REDUNDANT CONTROLLER SYNCHRONIZATION FOR BUMP-LESS FAILOVER DURING NORMAL AND PROGRAM MISMATCH CONDITIONS

FIELD OF TECHNOLOGY

The present invention relates generally to control systems and devices and, more particularly, to an apparatus for and a method of implementing redundant controller synchronization for bump-less failover during normal and mismatch conditions at the redundant controllers. The redundant controllers may have particular application in process control systems, but may also be implemented in control systems in general, such as flight control systems, robotic control systems and other mission critical control systems, that require redundancy and failover.

DESCRIPTION OF THE RELATED ART

Process control systems, such as distributed or scalable process control systems like those used in power generation, water and waste water treatment, chemical, petroleum or other processes, typically include one or more process controllers communicatively coupled to each other, to at least one host or operator workstation and to one or more field devices via analog, digital or combined analog/digital buses. The field devices, which may be, for example valves, valve positioners, switches and transmitters (e.g., temperature, pressure and flow rate sensors), perform functions within the process such as opening or closing valves and measuring process parameters. The process controllers receive signals indicative of process measurements made by the field devices and/or other information pertaining to the field devices, use this information to implement a control routine or control routines, and then generate control signals which are sent over the buses to the field devices to control the operation of the process. Information from the field devices and the controllers is typically made available to one or more applications executed by the operator workstation to enable an operator to perform any desired function with respect to the process, such as viewing the current state of the process, modifying the operation of the process, etc.

Process controllers are typically programmed to execute different algorithms, sub-routines or control loops (which are all control routines) for each of a number of different loops defined for, or contained within a process, such as flow control loops, temperature control loops, pressure control loops, etc. Generally speaking, each such control loop includes one or more input blocks, such as an analog input (AI) function block, a single-output control block, such as a proportional-integral-derivative (PID) or a fuzzy logic control function block, and a single output block, such as an analog output (AO) function block. These control loops typically perform single-input/single-output control because the control block creates a single control output used to control a single process input, such as a valve position, etc. However, in certain cases, the control loops may use more than a single process input and/or may produce more than a single process output. Depending on the part of the process being controlled, the control routines may execute at differing frequencies to perform their process control functions. For example, it may be necessary to monitor fluid flow rates and adjust valve positions in a turbine at a higher frequency than monitoring the temperature in a boiler and adjusting a heating element. Consequently, a flow rate sensor of a turbine may be sampled by a controller at a rate of one sample every ten milliseconds, with the control routine executing at the same rate to determine and output any necessary valve position adjustments. At the same time, because temperature changes occur more slowly, a thermocouple of a boiler may be sampled by the controller at a much lower rate, such as one sample per second, with the control routine executing at the same rate to determine and output any necessary heating and/or cooling element adjustments. The controller will similarly execute control routines at rates determined by the process control requirements for the process, and based on other factors such as the duration of time necessary to execute the control routine, communications limitations, etc.

As discussed above, the control routines receive process inputs and transmit calculated outputs. In addition to the input and output data associated with each control routine, the control routines may calculate and store additional information necessary to effect the necessary process control functions. This additional information, referred to herein at state information or state variables, may be the product of intermediate calculations performed by the control routines, or may be stored process inputs or process outputs that may be used by the control routine in subsequent executions. Examples of this state information include historical information regarding process inputs that have been received or process outputs that have been transmitted to the controlled devices, and trending information that may be calculated by the control routine as a baseline for comparison to future process input values received during subsequent executions of the control routine. While the process inputs and outputs are communicated between the controllers and the devices, and other information is transmitted between controllers and operator workstations, the state information particular to the control routines resides at the controllers and is not typically transmitted to other devices in the process control network.

It is typical for a process control system to incorporate redundant controllers to ensure that a failure of a single controller does not affect the availability of the control system. Such redundancy is implemented by providing a pair of controllers configured to perform the same process control and reporting functions, with one controller operating as the primary controller to perform process control, and the other controller operating as a backup controller in a standby mode until it is necessary for the backup controller to assume the primary controller role. Both controllers of the redundant pair are connected to the field devices and operator workstations in the same manner so that both are capable of transmitting and receiving messages with the other components of the process control system. While the primary controller functions to perform process control functions, the backup controller listens to the communications within the process control network for messages directed to or from the primary controller, and updates the information stored therein with the real time information already communicated within the system. Consequently, the backup controller receives the process inputs and outputs for the control routines as they are being communicated between the primary controller and the field devices, and receives reporting information transmitted between the primary controller and other controllers and operator workstations.

In addition to the information available from existing communications within the process control system, the state information for the control routines stored in the backup controller must also be updated with the values of the state information that are calculated by the control routines of the primary controller as the control routines are executed to perform process control. In the simplest implementation, the state information in its entirety may be periodically transmitted in a message from the primary controller to the backup controller. However, as discussed above, the control routines of the controllers execute at different frequencies and, therefore, the associated state information is updated at different frequencies. Consequently, a single transaction transmitting all state information at one time must be transmitted at the same frequency as the highest frequency control routine in order to ensure that the backup controller has the most up to date values of all the state information. The drawback in this approach is that the same values of the state information for the lower frequency control routines are transmitted multiple times, and thereby unnecessarily increasing the volume of network traffic. Conversely, if the single transaction is transmitted at a lower frequency, the values of the state information for the higher frequency control routines may be recalculated many times between transmissions to the backup controller, thereby increasing the risk that the backup controller may be operating with stale state information for some control routines when a failover occurs and the backup controller begins operating to perform the process control functions. Therefore, a need exists for a method for transferring state information between the primary controller and the backup controller in a manner such that the backup controller is updated with the current state information for the various control routines executing at the primary controller without unnecessarily increasing the volume of data being communicated in the process control system.

The basic mechanisms and problems outlined in the above discussion assumed that the control routines in both the primary and the backup controllers are identical. In actual practice, it is quite common to encounter time periods where the control routines are not the same in both controllers. This is referred to as a mismatch condition between the pair of controllers. The mismatch condition arises when the control routines of the pair are being reconfigured, and one of the controllers is updated with the new control routine while the other controller is still operating with the old configuration of the control routine. When the configuration of the control routine is changed, the control routine may use different state information, or the state information may be calculated in a different manner such that a particular state variable may have different calculated values calculated by the old and new configurations of the control routine even where a given process input yields the same process output under either configuration. In the mismatch condition, simply sending the state variables from the primary controller to the backup controller will not ensure a bump-less failover if the primary controller fails during the mismatch period. Therefore, a need also exists for an apparatus and method for determining the state information for the control routines of the backup controller in the event of a failover when a mismatch condition exists.

In many failure modes, the primary controller will only failover if the backup controller is operational and is healthy. When a backup controller powers up, the backup controller may need to evaluate various criteria in determining whether it is prepared to operate to perform the process control functions if a failover occurs. One criteria that may need to be satisfied for the backup controller to advertise itself as healthy is that all the control routine state variables must be received from the primary controller at least once. As was previously mentioned, in the case of a controller mismatch condition, the state variables may not be identical. In, some cases, control routines on the backup controller may contain state variables that are no longer used by the reconfigured control routines on the primary controller. Moreover, the backup controller may still have entire control routines that were deleted from the primary controller during the reconfiguration process. In these cases, a deadlock condition could occur where the backup controller will wait forever to advertise itself as healthy to the primary controller because it is waiting for the values of the state variables that the primary controller no longer stores. This deadlock situation could result in significant process control disruption due to the fact that the primary controller cannot failover. Therefore, a further need exists for redundant controllers wherein the backup controller can determine that it is in a healthy state while powering up during the mismatch condition despite the failure to receive all of the state variables for its control routines from the primary controller.

SUMMARY

In one aspect, the invention is directed to a pair of redundant controllers provided in a process control system wherein the control routines are separated, physically or logically, into separate control areas, with the state variables calculated therein being stored in the associated control areas. After each execution of the control routine of the control area by the primary controller, a control synchronization program of the primary controller is accessed to cause the transfer of the state variables from the control area of the primary controller to a corresponding control synchronization program of the backup controller. After the state variables are received at the backup controller, the control synchronization program causes the state variables to be stored in the corresponding control area of the backup controller.

In another aspect, the invention is directed to redundant controllers that may be configured such that the control synchronization program causes the backup controller to calculate the necessary state variables for the control areas using the corresponding process outputs most recently written by the primary controller in the event of a failover during the mismatch condition between the controllers. The control synchronization routine may store the most recent values of the process outputs received at the backup controller from the primary controller, or may retrieve the most recent values from other devices, such as the primary controller, the hardware cards for the field devices, or the field devices themselves. Once the most recent values of the process outputs are determined, the control synchronization program may cause all the control routines involved in calculating each process output to use the process output in a reverse calculation to determine corresponding state variable values that would result in the control routines calculating the process outputs during execution of the control routines while performing process control.

In a further aspect, the invention is directed to redundant controllers that may be configured such that the backup controller may advertise that it is healthy to the primary controller after powering up during a mismatch condition without receiving all of the state variables for control areas of the backup controller. The control synchronization programs of the controllers may be configured such that the control synchronization program of the primary controller may format and transmit a token message to the backup controller containing information regarding the control area information for the primary controller and the state information that the backup controller should expect to receive from the primary controller. In one embodiment, the token may include information identifying the control areas present in the primary controller and their execution frequency, and the number of state variables for each control area to be transmitted to the backup controller. The control area may be further configured to cause the backup controller to inform the primary controller that it is ready to assume control during a failover after receiving values for all the state variables indicated by the token message.

DETAILED DESCRIPTION

Figure 1:
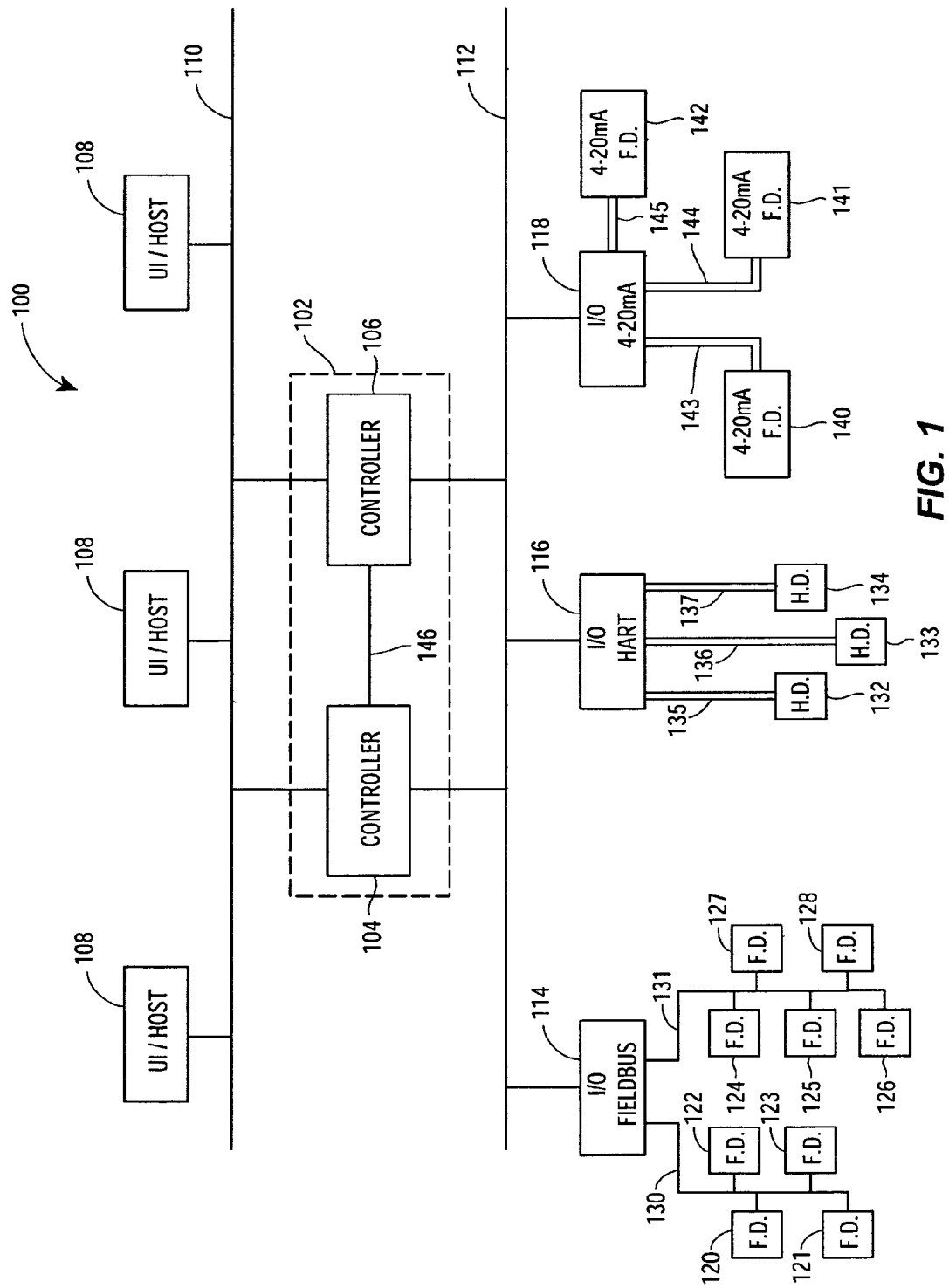
FIG. 1 is a schematic functional block diagram of a process control network incorporating redundant controllers.

Although the following text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

While the devices of the present invention are described in detail in conjunction with a process control network that implements process control functions in a decentralized or distributed manner using a set of Fieldbus, HART and 4-20 milliamp (mA) devices, it should be noted that the devices of the present invention can be used with process control networks that perform distributed control functions using other types of field devices and I/O device communication protocols, including protocols that rely on other than two-wire buses and protocols that support only analog or both analog and digital communications. Thus, for example, the devices of the present invention can be used in any process control network that performs distributed control functions even if this process control network uses the MODBUS, PROFIBUS, etc. communication protocols for communication between the I/O devices and field devices connected thereto, and uses any standard I/O communication protocol, or any proprietary I/O communication protocol (e.g. which may be implemented within the Ovation® process control system from Emerson Process Management Power and Water Solutions, Inc.) to effect communications between the controller and I/O devices of the process control system. Any other I/O communication protocols that now exist or that may be developed in the future may also be used. Furthermore, the I/O devices of the present invention may be used with any desired process control field device, including valves, positioners, transmitters, etc.

FIG. 1 illustrates a process control network 100 in which a pair of redundant controllers may be implemented. The process control network 100 includes a pair 102 of redundant controllers 104, 106, one or more host or operator workstations 108, and/or other computer devices such as other workstations, databases, configuration stations, etc. connected to a bus 110 which may be, for example, an Ethernet bus. As is known, the redundant controllers 104, 106 and workstations 108 include processors that implement software stored in memories of those devices. The redundant controllers 104, 106 may be, for example, distributed control system controllers or any other type of controllers implemented in, for example, a personal computer, dedicated processor or server, or other device that allows a user or an operator to interface with the process control system 100 in any known manner. While not shown, the process control network 100 may include additional controllers connected to the bus 110 and operating either alone or in combination with each other to form addition redundant pairs of controllers to perform process control functions and communicate with the other devices connected to the bus 110.

The redundant controllers 104, 106 are both connected to the bus 110, and are also connected to various I/O devices via a backplane 112 that may include a Fieldbus I/O device 114, a HART I/O device 116, and a 4-20 mA I/O device 118. Numerous field devices 120-128 are illustrated as being connected to the redundant controllers 104, 106 via the Fieldbus I/O device 114. The field devices 120-128 are illustrated as being connected to bus segments 130, 131 which may be any desired type of buses, such as a Fieldbus links. In this case, the devices 120-128 may use the Foundation Fieldbus communication protocol. Of course, each of the field devices 120-128 may be any type of field device used in the process control network 100 including, for example, sensors, control valves, positioners, fans, video cameras, microphones, etc.

The HART I/O device 116 connects HART devices 132-134 to the controllers 104 and 106 using HART communication lines 135-137, respectively, which provide both a digital and an analog communication link between the HART I/O device 116 and HART devices 132-134, as is understood by one skilled in the art. The 4-20 mA I/O device 118 is connected to 4-20 mA devices 140-142 via 4-20 mA communication lines 143-145, respectively. The 4-20 mA communication lines 143-145 provide an analog communication link between the 4-20 mA I/O device 118 and the 4-20 mA field devices 140-142, as is understood by one skilled in the art. The HART field devices 132-134, and the 4-20 mA field devices 140-142 may be, for example, sensors, control valves, and fans, as well as any other type of device compatible with the respective HART and 4-20 mA communication protocols. Other I/O devices utilizing other communication protocols now in existence or that become available in the future may be connected to the backplane 112, as is understood by one skilled in the art.

As illustrated in FIG. 1, the redundant controllers 104 and 106 are connected in parallel between the bus 110 and the backplane 112. In addition, a direct link 146 may be provided between the controllers 104 and 106 to form a dedicated connection allowing the controllers 104 and 106 to communicate directly with each other and to eliminate the need to transmit purely controller-to-controller synchronization communications over the bus 110 and/or backplane 112. However, in the absence of the link 146, the controllers 104 and 106 may be able to transmit synchronization communications over either the bus 110 or the backplane 112.

Figure 2:
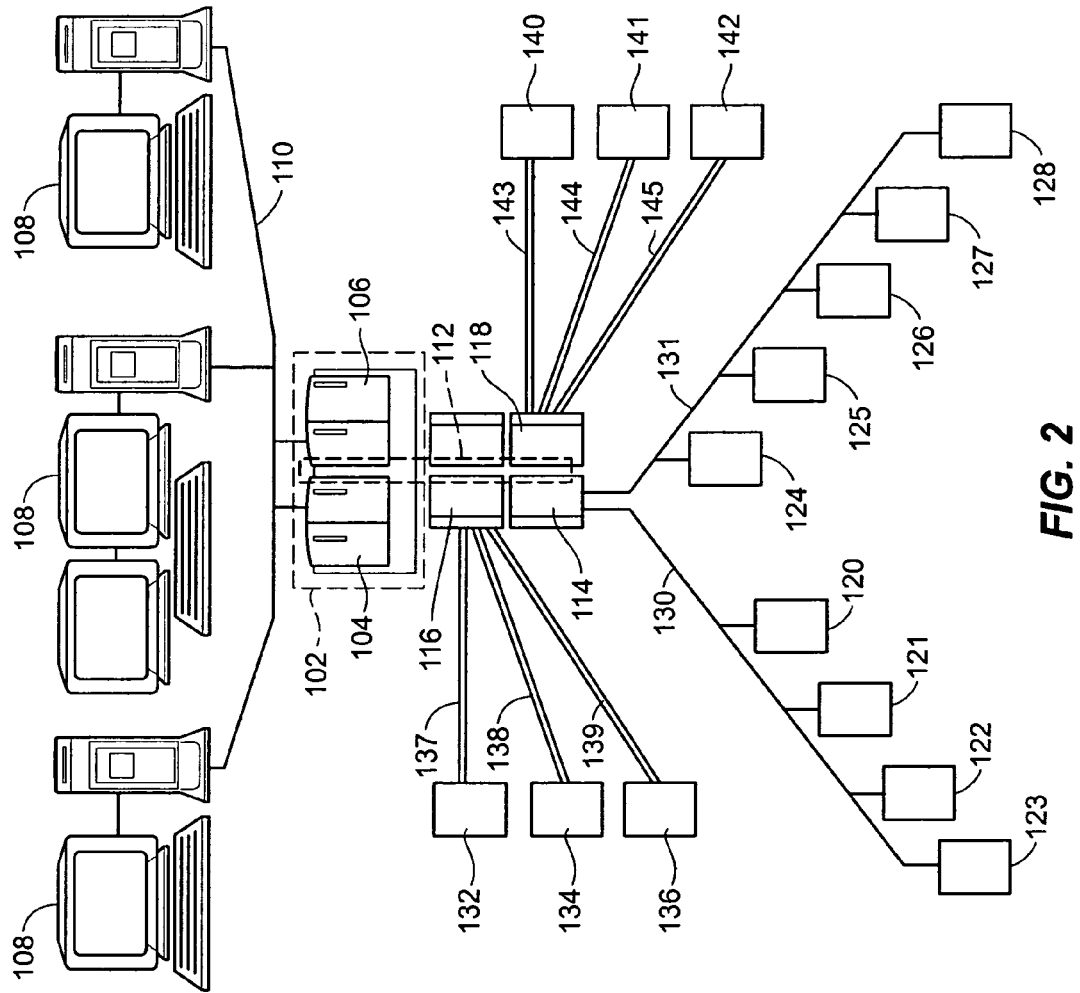
FIG. 2 is a schematic block diagram of the process control network of FIG. 1.

Referring now to FIG. 2, the physical configuration of the process control network 100 of FIG. 1 is illustrated. The controllers 104 and 106 are each connected to the bus 110, and the controllers 104 and 106 and the I/O devices 114, 116 and 118 are connected via the backplane 112 that may have a plurality of ports or slots with pin connections. The I/O devices 114, 116 and 118 are connected to the slots of the backplane 112, and the bus segments 130, 131 may be connected directly to the I/O device 114. Similarly, I/O devices 116 and 118 are connected to the corresponding devices 132-134 and 140-142, respectively. While the physical connection of the devices to the backplane 112 is primarily used for exchanging information between the devices and implementing process control, the physical connection may also be used to inform the controllers 104 and 106 as well as the other devices on the process control network 100 that specific controllers, for example the controllers 104 and 106, form the redundant pair of controllers 102, and for the controllers 104 and 106 to publish messages to each other indicating that they are capable and ready to perform process control.

Figure 3:
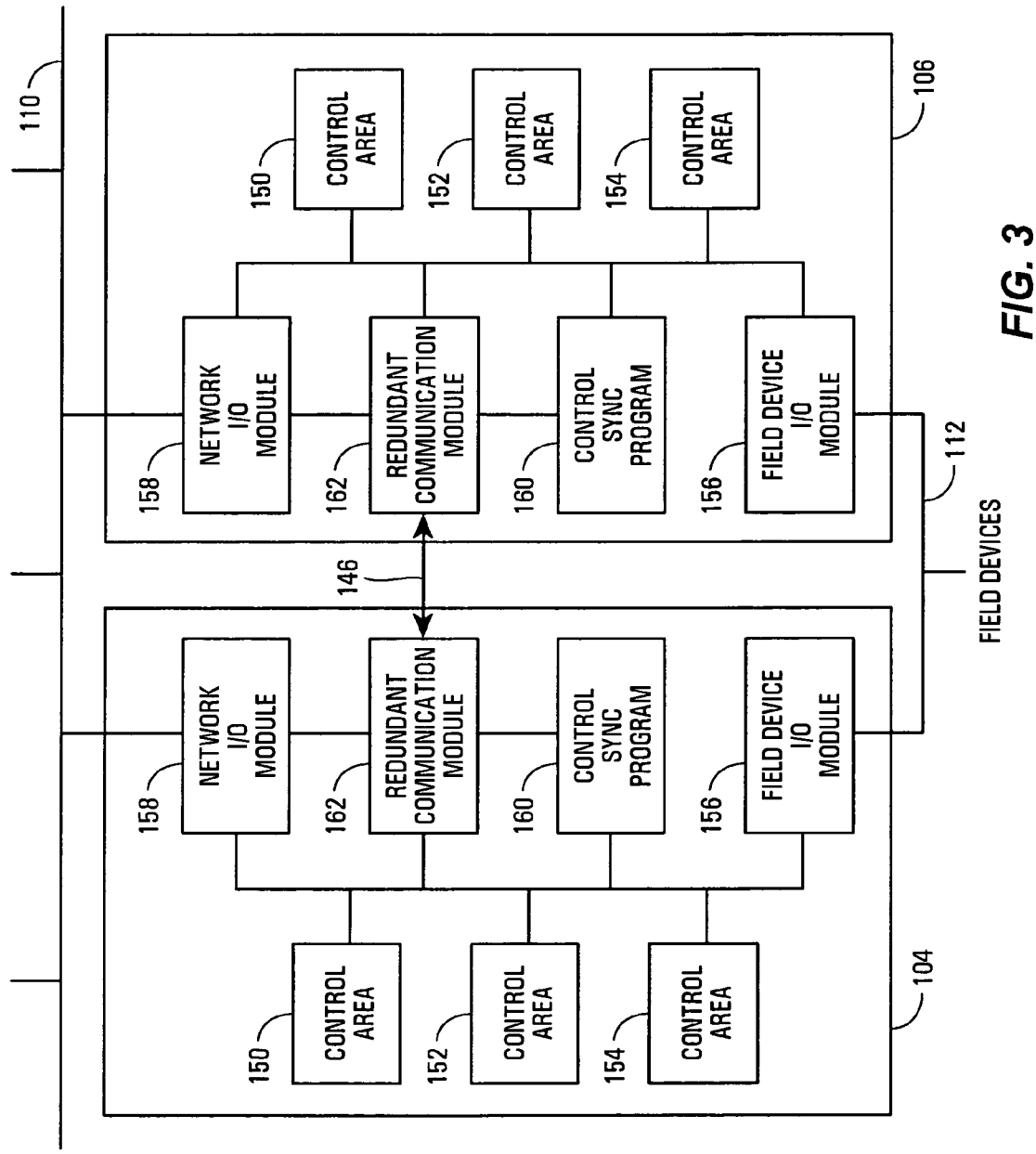
FIG. 3 is a more detailed block diagram of an embodiment of the redundant controllers of FIG. 1.

As discussed above, redundancy is implemented in the controllers 104 and 106 by configuring the controllers 104 and 106 to perform the same process control and reporting functions. Redundancy is further implemented by configuring the controllers 104 and 106 to perform the necessary synchronization functionality and exchange the necessary information so that the backup controller is prepared to take over for the primary controller in a failover situation. FIG. 3 illustrates one embodiment of the redundant controller 102 in accordance with the invention. Each controller 104, 106 may be configured with a plurality of control areas 150-154 that include individual control programs that may be executed by the controllers 104, 106 to perform process control. Depending on the configuration of the controllers 104, 106, the controllers 104, 106 may be segmented physically or logically to implement the control areas 150-154. In one implementation, the control areas 150-154 may be stored in segmented memory areas of the controllers 150-154 and grouped according to the required speed or frequency of execution. As illustrated in FIG. 3, each control area 150-154 of the primary controller 104 has a corresponding control area 150-154 in the backup controller 106 when the controllers 104, 106 are in the normal synchronized configuration. However, situations arise during the reconfiguration of the controllers 104, 106 wherein the control areas of the controllers 104, 106 are in a mismatch condition and the control programs are not identical between the controllers 104, 106. The mismatch condition and associated processing are discussed further below.

As discussed above, each control area 150-154 may execute at a different frequency depending on the devices or processes being controlled. For example, the control area 150 may include a monitoring program for a control valve of a turbine with a frequency of one execution of the control program every ten milliseconds. Further, the control area 152 may have a temperature control program for a boiler with a frequency of one execution of the control program every, one second. In this case, the control program of the control area 150 executes 100 times for each execution of the control program of the control area 152. Execution of the control areas 150-154 may occur according to the configurations of the control areas 150-154 themselves, or the controllers 104, 106 may further include control programs (not shown) configured to initiate the execution of the control areas 150-154 at the appropriate times according to the control strategy of the process control network 100.

In order to perform their process control functions, the control areas 150-154 must exchange information with the field devices and with the host workstations 108 of the process control network 100. To communicate with the field devices, the controllers 104, 106 each include a field device I/O module 156 configured to send and receive messages on the backplane 112. The field device I/O modules 156 may be any combination of software and hardware known in the art necessary to communicate with the I/O devices 114-118 and field devices to exchange process control information. Similarly, each controller 104, 106 includes a network I/O module 158 configured to send and receive messages on the bus 110. As with the field device I/O modules 156, the network I/O modules 158 may be any combination of software and hardware known in the art necessary to communicate with the host workstations 108 to exchange process control and process monitoring information.

In addition to communicating with the field devices and the host workstations 108, the controllers 104, 106 must be configured to communicate with each other to ensure synchronization between the controllers 104, 106 to facilitate bumpless transition to the backup controller 106 in the event of a failover by the primary controller 104. To coordinate the synchronization, each of the controllers 104, 106 may further include a control synchronization program 160. The control synchronization program 160 may be configured to perform the functions necessary to synchronize the controllers 104, 106 whether the particular controller 104, 106 is functioning as the primary controller or the backup controller. When the controller 104 or 106 is functioning as the primary controller, the control synchronization program 160 may receive updated or recalculated state information from the control areas 150-154 after the control areas 150-154 execute to perform process control, and may cause the state information to be transmitted to the backup controller. Conversely, when the controller 104 or 106 is functioning as the backup controller, the control synchronization program 160 may receive the updated state information from the primary controller and cause the state information to be stored in the memory associated with the corresponding control areas 150-154.

The control synchronization program 160 of each controller 104, 106 may operate in conjunction with a redundant communication module 162 that controls the transfer of synchronization information, such as updated state information, between the controllers 104, 106. As previously discussed, the controllers 104, 106 may be connected directly by the communication link 146 to facilitate direct communication of synchronization and other information between the controllers 104, 106 without increasing the volume of communications over the bus 110 and the backplane 112. However, depending on the implementation, the direct communication link 146 may not be present, and it may be necessary for the controllers 104, 106 to exchange information over the bus 110 or the backplane 112 to which both controllers 104, 106 are connected. As a result, the redundant communication modules 162 may be configured with an software and hardware known in the art necessary to communicate over the communication link 146, if present, and to access the network I/O module 158 and/or the field device I/O module 156 if the communication link 146 is not present, to transmit information back and forth between the controllers 104, 106 when the redundant communication module 162 is accessed by the control synchronization program 160. Details regarding the functionality of the control synchronization program 160 and the redundant communication module 162 to synchronize the controllers 104, 106 will be discussed further below.

Synchronization of State Information Between Redundant Controllers

During normal operation of the process control network 100 when the controllers 104, 106 are operating under identical versions of software, the control areas 150-154 of the primary controller 104 execute at the specified intervals to perform process control and to provide process monitoring information to the host workstations 108. As previously discussed, the primary controller 104 exchanges process control information with the field devices over the backplane 112, and process control and process monitoring information with the host workstations 108 over the bus 110. Because the backup controller 106 is also connected to the bus, 110 and the backplane 112, the field device I/O module 156, network I/O module 158 and control synchronization program 160 of the backup controller 106 can monitor the communications of the primary controller 104 to acquire any process control and process monitoring information on the bus 110 and backplane 112 necessary for synchronization of the backup controller 106 with the primary controller 104. To maintain synchronization with the primary controller 104, however, the backup controller 106 must also acquire the state information used and updated by the control areas 150-154 of the primary controller 104 during the performance of process control but not normally transmitted to other devices in the process control network 100. To ensure the state information is transferred from the primary controller 104 to the backup controller 106, the control areas 150-154 and the control synchronization programs 160 are configured to exchange information in a timely manner to ensure full synchronization between the controllers 104, 106.

Figure 4:
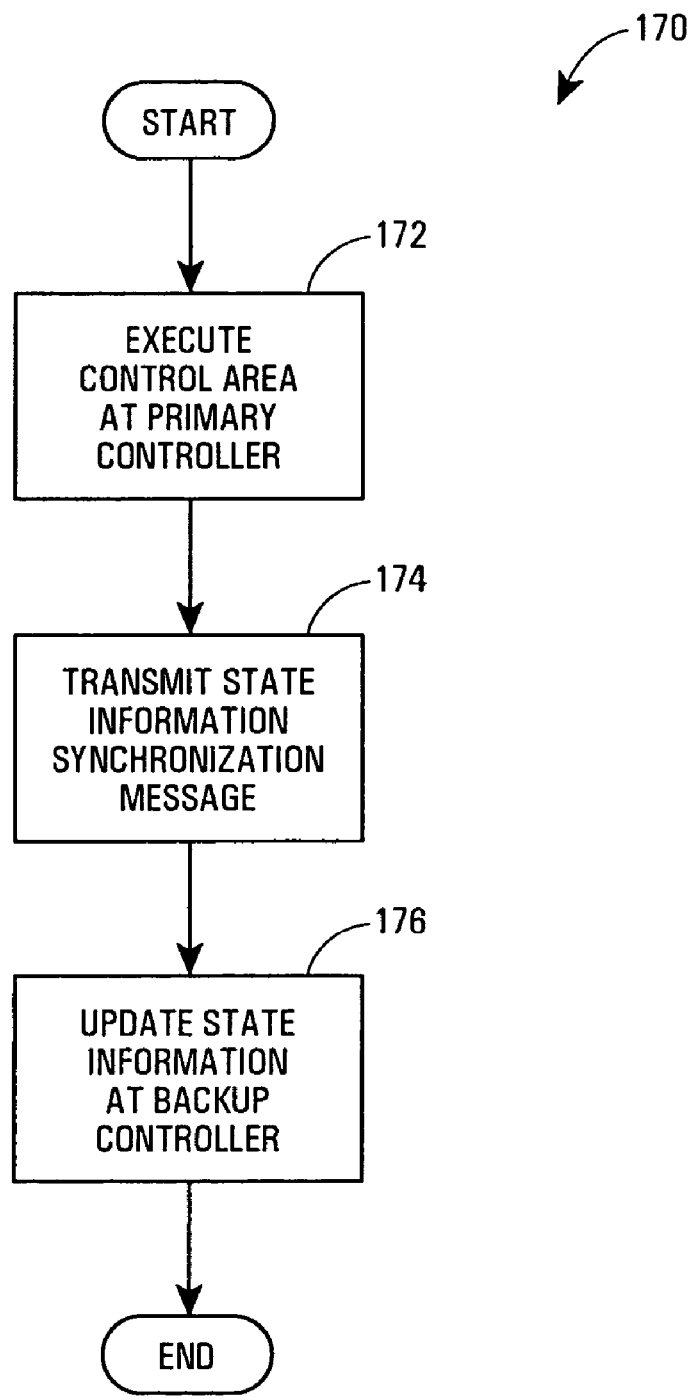
FIG. 4 is a flow diagram of a state information synchronization routine that may be implemented in the redundant controllers shown in FIGS. 1-3.

FIG. 4 illustrates one embodiment of a state information synchronization routine 170 that may be implemented in the redundant controllers 104, 106. The state information synchronization routine 170 may begin at a block 172 wherein one or more of the control areas 150-154 of the primary controller 104 may execute to perform process control according to the process control schedule. The control areas 150-154 may be configured to execute with a fixed frequency or at a predetermined time according to the implemented control strategy. Alternatively, the controllers 104, 106 may include a control program that is configured to execute according to the control schedule. Depending on the requirements for the particular devices being controlled by the process control applications of the control areas 150-154, each of the control areas 150-154 may be executed with a different frequency. For example, the control area 150 executing the process control application for monitoring the control valve of the turbine may execute with a frequency of one execution per millisecond, while the control area 152 executing the process control application for regulating the temperature of a boiler may execute with a frequency of one execution per second. In order to be able to assume the process control functions, the backup controller 106 needs to receive the state information for the various control areas and associated process control applications at or near the control area execution frequency to ensure that a failover from the primary controller 104 to the backup controller 106 is bumpless. The frequency at which the backup controller 106 receives the state information is particularly vital when the plant is in a dynamic state with the operating conditions within the process control system changing over the passage of time.

After a control area 150-154 executes at block 172, control may pass to a block 174 wherein the state variables for the control area 150-154 are transmitted from the primary controller 104 to the backup controller 106. In order to ensure that the state information for each control area in the primary controller 104 is provided to the backup controller 106 in a timely manner, and without creating excessive amounts of communication traffic over the communication link 146, the bus 110 or the backplane 112, the state variables may be transmitted from the primary controller 104, to the backup controller 106 at the same frequency as the execution of the applications in the control areas 150-154. The memory organization allows the state variables for each control area to be copied at the end of the execution period of the control area and transmitted to the backup controller 106 at that time. This configuration ensures that the backup controller 106 will have a current snap-shot of the state information of the process control applications running on the primary controller 104 at all times because the state variables are updated at the rate that they are recalculated or otherwise updated at the primary controller 104. Further, this configuration optimizes the bandwidth and communications between the controllers 104, 106 by transmitting only the information that is or may have been updated. Consequently, after executing, the control area 150-154 transfers the state variable values to the control synchronization program 160 of the primary controller 104. The control areas 150-154 may each be configured to transfer the state information at the end of executing their process control functions, or the control synchronization program 160 may be configured to request the state information from the control areas 150-154 or retrieve the state information from memory after the control areas 150-154 execute, either on its own according to a preset schedule, or as initiated by a control program of the primary controller 104.

Once the state information is obtained, the control synchronization program 160 may format synchronization messages containing the values of the state variables, identifiers for the state variables, identifiers for the control areas 150-154 to which the state variables correspond, if necessary, and any other information necessary to transfer the state information to the backup controller 106 and to store the state information in the appropriate locations for use by the control areas 150-154 in the event of a failover. Once compiled, the control synchronization program 160 may pass the synchronization messages to the redundant communication module 162 for transmittal to the backup controller 106. If the communication link 146 is present, the redundant communication module 162 of the primary controller 104 may transmit the synchronization messages over the link 146 to the redundant communication module 162 of the backup controller 106. If not, the redundant communication module 162 may transfer the synchronization messages to network I/O module 158 or the field device I/O module 156 for transmittal over the bus 110 or backplane 112, respectively. The modules 156, 158 at the primary controller 104 may format the synchronization messages according to the appropriate protocol and address the messages to the backup controller 106 so that the corresponding module 156, 158 of the backup controller 106 detects and receives the synchronization messages with the state information. When the messages are detected and received at the I/O modules 156, 158 of the backup controller 106, the state information is stripped from the messages and transferred to the redundant communication module 162 and on to the control synchronization program 160.

When the state information is received at the control synchronization program 160 of the backup controller 106, control passes to a block 176 of the routine 170 wherein the state information of the control areas 150-154 is updated with the state information from the synchronization message from the primary controller 104. The control areas 150-154 may be configured to receive the state information from the control synchronization program 160 and update the values of the state variables. Alternatively, the control synchronization program 160 may be configured to update the storage locations in memory corresponding to the control areas 150-154 with the new values of the state variables.

Failover During Controller Mismatch Condition

The basic synchronization process and problems outlined above assumed that the process control applications of the control areas 150-154 on both the primary controller 104 and the backup controller 106 are identical in number and configuration. In actual practice, however, it is common to encounter time periods where the process control applications are not the same in both controllers, such as when the process control applications are being reconfigured by an operator using a configuration application at one of the host workstations 108. If the control areas 150-154 are not identical on both controllers 104 and 106, then the state variables may not necessarily be identical on both controllers 104 and 106. This can happen either where different versions of one or more of the control areas 150-154 exist on the controllers 104, 106, or when a control area exists on the backup controller 106 and not on the primary controller 104. In the mismatch condition, simply transmitting the state variables from the primary controller 104 to the backup controller 106 may not ensure a bumpless failover if the primary controller 104 fails during this period.

Periodically, it is necessary to reconfigure the controllers 104, 106 to implement different process control functionality, either by changing the control areas 150-154, or by adding or removing control areas in their entirety. In one implementation, configuration software at a host workstation 108 allows an operator to reconfigure the controllers 104, 106 by modifying and building control areas. For redundant controllers 102, the controllers 104, 106 may be displayed to the operator as a single controller, while the configuration software knows that it is reconfiguring a redundant pair. The operator may make the necessary modifications to the redundant controller 102, and the configuration software may save the changes to a configuration database. In many process control networks 100, the configuration software can only load the changes to one of the controllers 104, 106 of the pair at a time, and the changes may be downloaded to the controllers 104, 106 in either order. In one implementation, the configuration software may download the changes to the primary controller 104 first and set a mismatch indicator at the backup controller 106. The mismatch indicator may reside in the control synchronization program 160 of the backup controller 106. Once the changes are downloaded to the backup controller 106, the configuration software may reset the mismatch indicator to indicate the controllers 104, 106 are again synchronized with respect to the versions of process control software in the control areas 150-154.

In the case where the process control applications are not identical on both controllers 104 and 106, the control areas 150-154 may be configured to calculate the state variables for the process control applications on the backup controller 106 when the primary controller 104 fails using the current operating state of the process control system. More precisely, using the values of the process outputs that were last transmitted by the primary controller 104, the control areas of the backup controller 106 calculates the values of the state variables that would have been necessary for the process control applications to output the values of the process outputs. The values of the process outputs may be transmitted from the control areas 150-154 to the controlled devices via output I/O modules of the control areas 150-154. The output I/O modules may be implemented in the control areas 150-154 in any known manner, such as by configuring the control areas 150-154 with separate I/O programs within the control areas 150-154, or as part of the process control application programs of the control areas 150-154.

Figure 5:
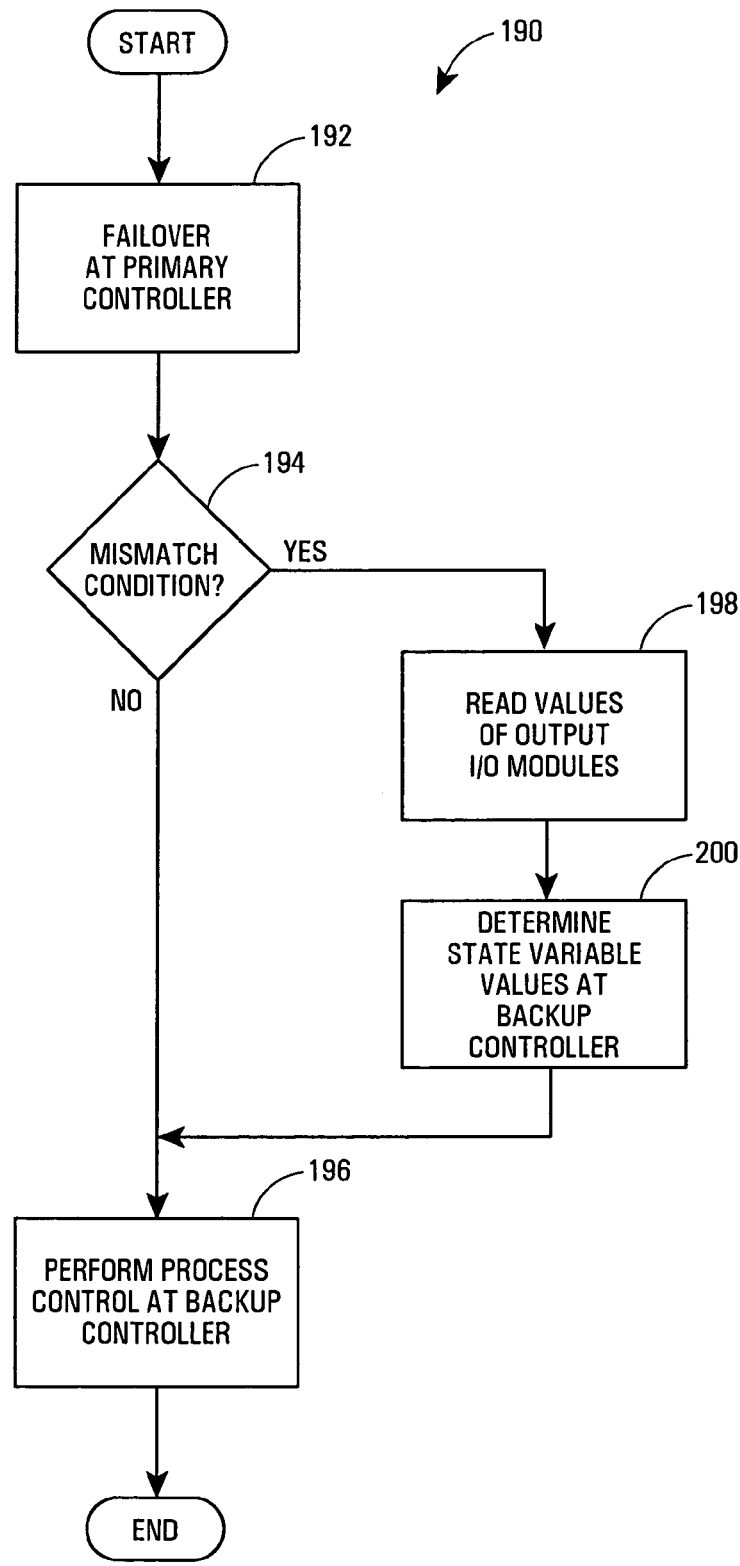
FIG. 5 is a flow diagram of a redundant controller failover routine that may be implemented in the redundant controllers shown in FIGS. 1-3.

FIG. 5 illustrates an embodiment of a routine 190 for handling the failover of the primary controller 104. The routine 190 begins at a block 192 wherein the primary controller 104 experiences a failover condition. When the primary controller 104 enters the failover condition, the primary controller 104 transmits a failover message to the backup controller 106 via the communication link 146, if available, the bus 110 or the backplane 112. The control synchronization program 160 or a control program of the primary controller 104 may be configured to cause the transmission of the failover message in response to the failover condition. Upon receiving the failover message at the backup controller 106, control may pass to a block 194 wherein the backup controller 106 determines whether a program mismatch condition exists. The mismatch condition may be evaluated based on the value of the mismatch indicator. If the mismatch indicator indicates that the control areas of the controllers 104, 106 match, control may pass to a block 196 wherein the backup controller 106 begins performing the process control functions using the state information previously received from the primary controller 104 and stored with the corresponding control areas 150-154.

If the mismatch indicator is set to flag the mismatch condition between the controllers 104, 106, control may pass to a block 198 wherein the control synchronization program 160 of the backup controller 106 will begin the process of determining the state variables for the control areas 150-154 of the backup controller 106 by reading the most recent values of the output 110 modules of the control areas 150-154 of the primary controller 104. The values of the output I/O modules represent the most recently determined settings, or setting adjustments, for the field devices controlled by the redundant controller 102, and may be obtained from several different sources depending on the reliability of the data, the communication restrictions of the process control network and other factors. In one implementation, the backup controller 106 may use the values of the output I/O modules from the messages most recently received at the backup controller 106 from the primary controller 104. Alternatively, the control synchronization program 160 may cause the field device I/O module 156 to pole the I/O devices 114, 116 and 118 via the backplane 112 for the values currently stored on their hardware cards. When the values of the output I/O modules are transmitted through the I/O devices 114, 116 and 118 to the field devices 120-128, 132-134 and 140-142, respectively, the 110 devices 114, 116 and 118 may store the values, at least temporarily, on their hardware cards or other storage locations. As a further alternative, the control synchronization program 160 may cause the field device 110 module 156 to pole the field devices themselves for their current settings corresponding to the output 110 module values most recently received at the field devices. Other sources of the output I/O module values will be apparent to those skilled in the art and are contemplated as having use with redundant controllers in accordance with the invention.

Once the values of the output I/O modules of the control areas 150-154 of the primary controller 104 are retrieved, control may pass to a block 200 wherein values for the state variables of the control areas 150-154 are calculated or otherwise determined using the output I/O module values. Part of the configuration of each control area 150-154 may include logic to back-calculate values for the state variables based on given values of the output I/O modules. The control synchronization program 160 may transfer the retrieved values of the output I/O modules to the corresponding control areas 150-154 and initiate the process or program for calculating the state variables. Depending on the control application logic, the devices being controlled and the state variables being calculated, among other factors, the control areas 150-154 may calculate a precise value for a given state variable, or an approximate value that may be sufficient to prevent the control area from determining an extreme value for an output I/O module when the backup controller 106 assumes control that may cause adverse effects on the process control network 100. After the control areas 150-154 have performed calculations for the state variables, control may pass to block 196 wherein the backup controller 106 begins performing process control functions in place of the primary controller 104 using the calculated values of the state variables.

Initializing the Backup Controller at Startup

Figure 6:
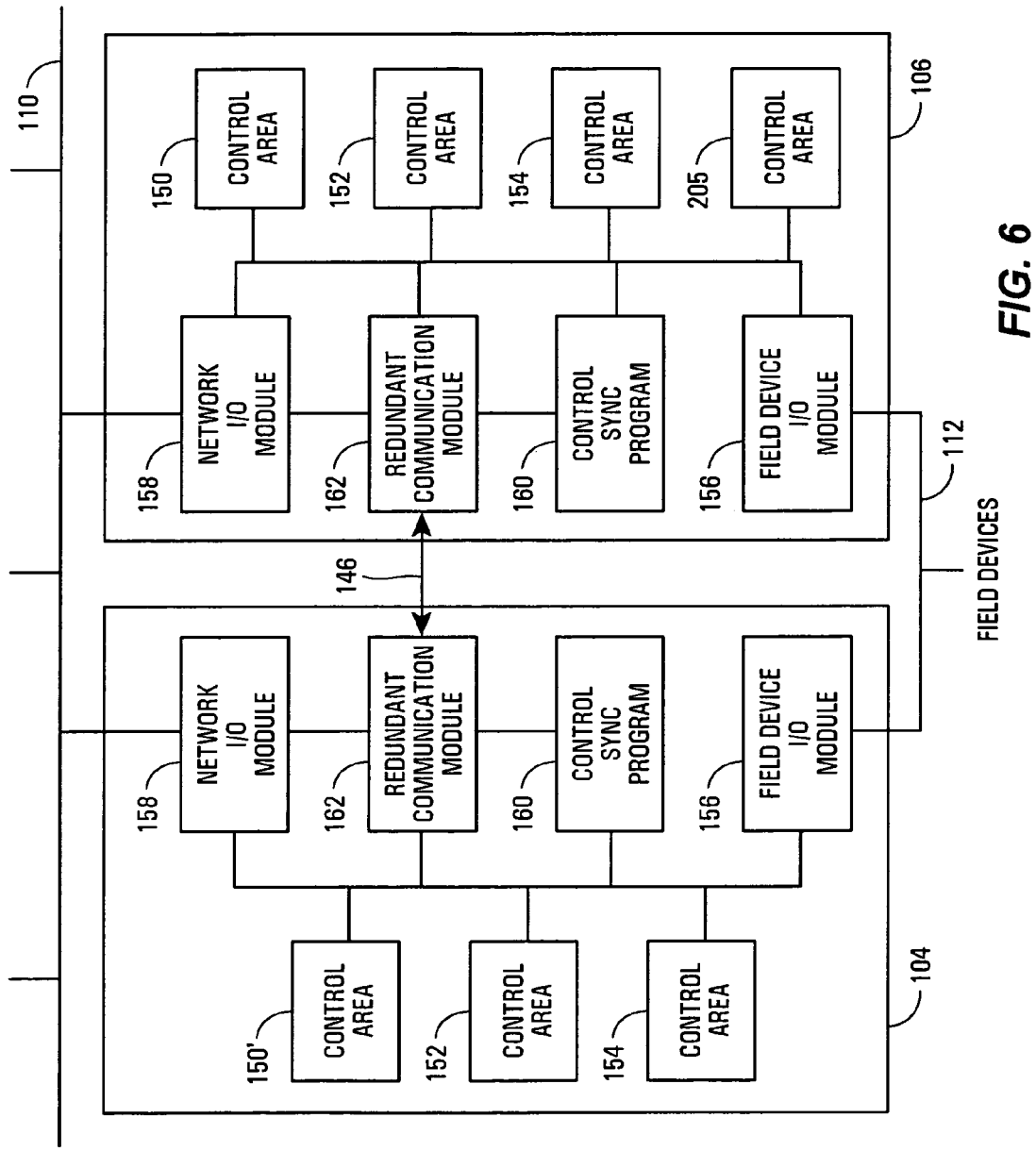
FIG. 6 is a more detailed block diagram of the redundant controllers of FIGS. 1 and 3 with the redundant controllers in a mismatch condition.

In many failure modes, a primary controller will only failover if the backup controller has notified the primary controller that it is healthy and ready to perform the necessary process control functions if the primary controller fails. One of the criteria that typically must be satisfied in order for a backup controller to notify the primary controller that it is healthy is the receipt of all the state variables from the primary controller at least once. FIG. 6 illustrates controllers 104, 106 in a mismatch condition. In this example, the primary controller 104 has been reconfigured such that the control area 150' is a reconfigured application for controlling the control valve of the turbine, and a control area has been deleted from the primary controller 104 such that the backup controller 106 includes a control area 205 not found in the primary controller 104. As was mentioned previously, in the case of a process control program mismatch, the state variables may not be identical. In some cases, the backup controller may contain state variables that the primary controller does not. For example, control area 150' may no longer use a state variable used in the control area 150, and none of the state variables of control area 205 are found at the primary controller 104. In this case in previous redundant controllers, a deadlock condition could occur where the backup controller 106 will wait forever to notify the primary controller 104 that it is healthy since it will not receive state variables for the control areas 150 and 205 that are no longer used by the reconfigured process control applications on the primary controller 104. The deadlock situation could result in a significant process disruption due to the fact that the primary controller cannot failover.

Figure 7:
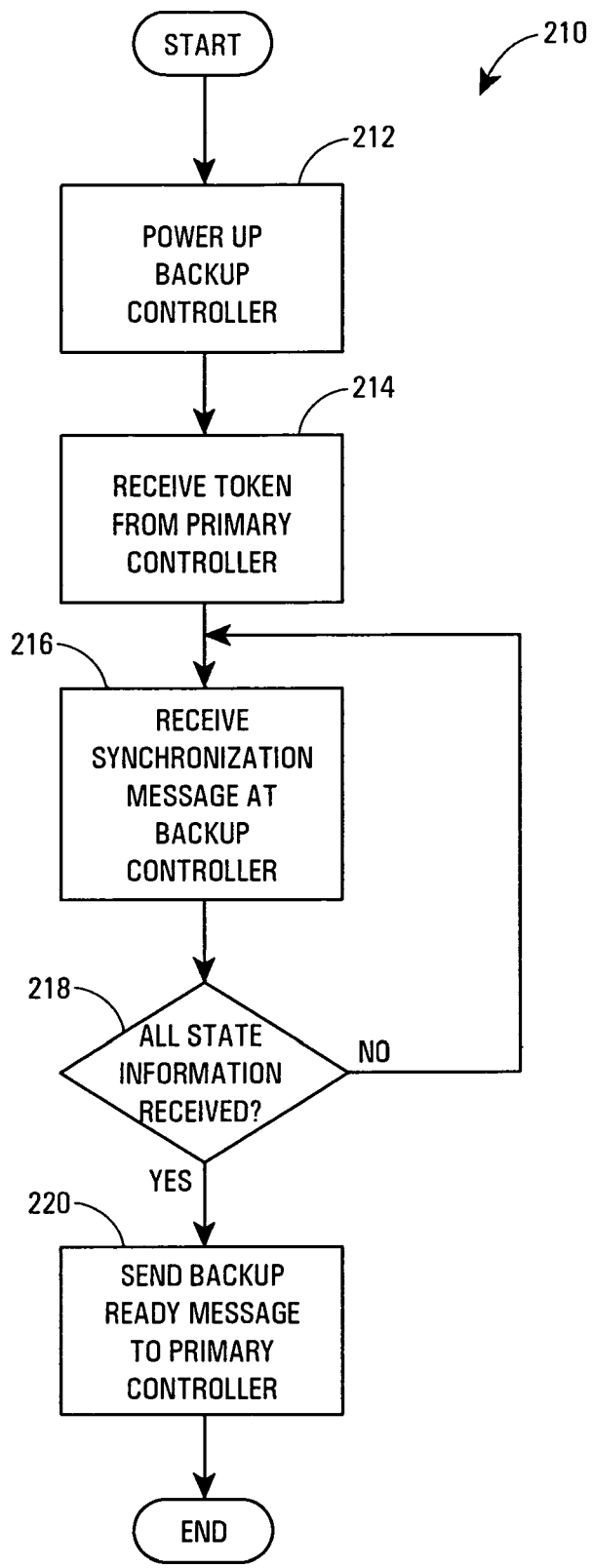
FIG. 7 is a flow diagram of a backup controller initialization routine that may be implemented in the redundant controllers shown in FIGS. 1-3.

To prevent this potential deadlock situation, the control synchronization programs 160 of the controllers 104, 106 may be configured such that the backup controller 106 will only expect the state variables present in the control areas 150', 152 and 154 of the primary controller 104, and will notify the primary controller 104 of its availability to assume process control once those state variables are received. FIG. 7 illustrates a routine 210 for initializing the backup controller 106 during startup when the controllers 104, 106 are in a mismatch condition. The controllers 104, 106 may be configured to follow the routine 210 during every startup, or alternatively to perform the routine 210 only during the mismatch condition as determined based on the value of the mismatch indicator. The routine 210 may begin at a block 212 wherein the backup controller 106 is powered up after being taken out of service.

Once the backup controller 106 is powered up, control may pass to a block 214 wherein the backup controller 106 may receive a token from the primary controller 104 containing a snapshot of the control area data used by the primary controller 104. At the time the primary controller 104 is configured by the configuration software, information regarding control areas 150', 152 and 154 and the state variables use therein may be sent to and stored by the control synchronization program 160 of the backup controller 106. The control area information in the token message may include identification of the control areas 150', 152 and 154 implemented at the primary controller 104, the frequency of execution of the control areas 150', 152 and 154 and associated periods at which the state variables will be transmitted to the backup controller 106, the number, size and data types of the state variables for each control area 150', 152 and 154, and/or any other information necessary for the backup controller 106 to know what state variables to expect from the primary controller 104. During the normal operation of the primary controller 104, the control synchronization program 160 may cause redundant communication module 162 to transmit the token message over the communication link 146, bus 110 or backplane 112 to the backup controller 106 at regular intervals. In one embodiment, the primary controller 104 may transmit the token message at the same rate as the control area executing at the highest frequency to ensure that the backup controller 106 has the most current information for the primary controller 104. Alternatively, the token messages may be transmitted less frequently, such as at a regular but lower frequency, or in response to a triggering event such as the reconfiguration of the primary controller 104 or the receipt of a request for a token message initiated by the control synchronization program 160 of the backup controller 106 during startup.

When the token message is received at the redundant communication module 162 of the backup controller 106 and transferred to the control synchronization program 160, the control synchronization program 160 may update the information currently stored at the backup controller 106 regarding the configuration of the primary controller 104. After storing the token message information is stored, control may pass to a block 216 wherein the backup controller 106 begins receiving synchronization messages from the primary controller 104 and updating the control areas 150-154 as discussed above. As the configuration messages are received, the control synchronization program 160 of the backup controller 106 may compare the information in the synchronization messages to the stored configuration information for the primary controller 104, and update the primary controller 104 information to reflect the receipt of messages for control areas and/or state variables that the backup controller 106 is expecting to receive.

After a configuration message is received and the information for the primary controller 104 is updated at the backup controller 106, at a block 218 the control synchronization program 160 of the backup controller 106 may determine whether at least one value of each of the state variables identified in the token message has been received at the backup controller 106. If less than all of the state variables have been received, control may pass back to the block 216 where the backup controller 106 receives additional synchronization messages from the primary controller 104 until all of the state variables have been received. Once the control synchronization program 160 of the backup controller 106 determines that all of the state variables have been received at least once at block 218, control may pass to a block 220 wherein the control synchronization program 160 of the backup controller 106 causes the redundant communication module 162 to transmit a ready message to the primary controller 104 indicating that the backup controller 106 is ready to take over the process control functions of the redundant controller 102 if the primary controller 104 fails. The control synchronization program 160 of the primary controller 104 may update an indicator stored at the primary controller 104 upon receiving the ready message from the backup controller 106 so the primary controller 104 knows it can failover to the backup controller 106 if such condition arises.

While the preceding text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

What is claimed is:

1. A pair of redundant controllers in a process control network, wherein the redundant controllers are communicatively linked to each other and to other devices of the process control network by a bus, wherein the controllers and the devices transmit process control messages over the bus, each of the redundant controllers comprising:

a plurality of control areas each having a process control application program for performing process control functions, wherein each control area includes state variables that are used by the process control application program to perform the process control functions, and that is are updated when the control area executes to perform process control, and wherein values of the state variables are stored at the controller and is are not transmitted to the other devices; and a redundant communication module, wherein one redundant controller operates as a primary controller to perform process control by executing the process control applications of the control areas, and the other redundant controller operates as a backup controller, wherein at least two of the control areas of the primary controller execute at different frequencies, wherein the redundant communication module of the primary controller transmits a synchronization message to the backup controller after the process control application program of a control area executes to perform process control, the synchronization message containing values of the state variables from the control area, wherein synchronization messages for control areas having higher frequencies of execution are transmitted without waiting for the execution of control areas having lower frequencies of execution, and wherein the backup controller updates the values of the state variables of a control area of the backup controller corresponding to the executed control area of the primary controller with the values of the state variables from the synchronization message in response to receiving the synchronization message at the backup controller.

2. A pair of redundant controllers according to claim 1, wherein the redundant controllers are communicatively linked by a dedicated communication link, and the redundant communication module of the primary controller transmits the synchronization message to the backup controller over the dedicated communication link.

3. A pair of redundant controllers according to claim 1, wherein the redundant communication module of the primary controller transmits the synchronization message to the backup controller over the bus.

4. A pair of redundant controllers according to claim 1, each of the redundant controllers comprising a control synchronization program, wherein the executed control area transfers the values of the state variables to the control synchronization program of the primary controller and the control synchronization program of the primary controller formats the synchronization message, and wherein the synchronization message is transferred to the control synchronization program of the backup controller when the synchronization message is received at the backup controller.

5. A pair of redundant controllers according to claim 4, wherein the control synchronization program of the backup controller transfers the values of the state variables from the synchronization message to the control area of the backup controller corresponding to the executed control area of the primary controller, and wherein the corresponding control area updates the values of its state variables with the values of the state variables from the synchronization message.

6. A pair of redundant controllers according to claim 4, wherein the control synchronization program of the backup controller updates the values of the state variables of the control area of the backup controller corresponding to the executed control area of the primary controller with the values of the state variables from the synchronization message in response to receiving the synchronization message from the primary controller.

7. A method for synchronizing redundant controllers in a process control network with one controller operating as a primary controller to perform process control and another controller operating as a backup controller, wherein each of the redundant controllers has a plurality of control areas each having a process control application program for performing process control functions, wherein each control area includes state variables that are used by the process control application program to perform the process control functions, that are updated when the control area executes to perform process control, and that are stored at the controller and is-are not transmitted to the other devices, and wherein at least two of the control areas execute at different frequencies, the method comprising:

executing the process control application program of one of the control areas of the primary controller;

formatting a synchronization message at the primary controller with values of the state variables from the executed control area after the process control application program executes; transmitting the synchronization message from the primary controller to the backup controller, wherein synchronization message for a control area having a higher frequency of execution is transmitted without waiting for the execution of a control area having a lower frequency of execution; and updating the values of the state variables of a control area of the backup controller corresponding to the executed control area of the primary controller with the values of the state variables from the synchronization message in response to receiving the synchronization message at the backup controller.

8. A method according to claim 7, wherein transmitting comprises transmitting the synchronization message over a dedicated communication link between the redundant controllers.

9. A method according to claim 7, wherein transmitting comprises transmitting the synchronization message over a bus communicatively linking the redundant controllers and other devices of the process control network.

10. A method according to claim 7, wherein each of the redundant controllers includes a control synchronization program, the method comprising:

transferring the values of the state variables of the executed control area to the control synchronization program of the primary controller;

formatting the synchronization message at the control synchronization program of the primary controller; and receiving the synchronization message at the control synchronization program of the backup controller.

11. A method according to claim 10, comprising:

transferring the values of the state variables from the synchronization message from the control synchronization program to the control area corresponding to the executed control area of the primary controller; and updating the values of the state variables at the control area of the backup controller with the values of the state variables from the synchronization message.

12. A method according to claim 10, comprising, at the control synchronization program of the backup controller, updating the values of the state variables of the control area of the backup controller corresponding to the executed control area of the primary controller with the values of the state variables from the synchronization message in response to receiving the synchronization message from the primary controller.

13. A pair of redundant controllers in a process control network, wherein the redundant controllers are communicatively linked to each other and to other devices of the process control network by a bus, wherein the controllers and the devices transmit process control messages over the bus, each of the redundant controllers comprising:

a plurality of control areas each having a process control application program for performing process control functions, wherein each control area includes state variables that are used by the process control application program to perform the process control functions, and that are updated when the control area executes to perform process control, wherein the values of the state variables are stored at the controller and are not transmitted to the other devices, and wherein the control areas further include output I/O modules that format and transmit process control messages containing process output values used by corresponding controlled field devices to assume operational states determined by the process control application programs of the control areas;

a control synchronization program; and wherein one redundant controller operates as a primary controller to perform process control by executing the process control applications of the control areas, and the other redundant controller operates as a backup controller, wherein a controller mismatch condition exists when the redundant controllers are programmed with different configurations of control areas, wherein the primary controller transmits a primary controller failure message to the backup controller during a failover condition, wherein the backup controller determines whether the controller mismatch condition exists in response to receiving the primary controller failure message from the primary controller, wherein the control synchronization program of the backup controller retrieves process output values of the output I/O modules of the control areas of the primary controller in response to determining that the controller mismatch condition exists at the backup controller, wherein the backup controller determines values of the state variables for the control areas of the backup controller using the retrieved process output values of the output I/O modules of the control areas of the primary controller, and wherein the backup controller begins performing process control functions at the backup controller by executing the process control application programs of the control areas of the backup controller after one of determining that the controller mismatch condition does not exist and determining the values of the state-variables for the control areas after determining that the controller mismatch condition exists.

14. A pair of redundant controllers according to claim 13, wherein the control synchronization modules include a controller mismatch condition indicator, wherein the controller mismatch condition indicator of the control synchronization module of the backup controller is set when the controller mismatch condition occurs, and wherein the existence of the controller mismatch condition is determined by evaluating the value of the controller mismatch condition indicator of the control synchronization module of the backup controller.

15. A pair of redundant controllers according to claim 13, wherein the control synchronization program of the backup controller receives the process control messages containing process output values of the output I/O modules transmitted over the process control network by the primary controller during the performance of process control functions, wherein the control synchronization program of the backup controller stores the process output values of the output I/O modules from the received process control messages, and wherein the control synchronization program of the backup controller retrieves the process output values of the output I/O modules of the control areas of the primary controller stored at the backup controller in response to determining that the controller mismatch condition exists.

16. A pair of redundant controllers according to claim 13, wherein the redundant controllers are communicatively linked to the field devices by an I/O device and the I/O device stores process output values of the output I/O modules transmitted to the filed devices, wherein the control synchronization program of the backup controller transmits request messages to the I/O device for process output values of the output I/O modules stored at the I/O device, and wherein the backup controller receives response messages from the I/O device containing stored process output values from the output I/O modules.

17. A pair of redundant controllers according to claim 13, wherein the control synchronization program of the backup controller transmits request messages to the field devices for process output values of the output I/O modules stored at the field devices, and wherein the backup controller receives response messages from the field devices containing stored process output values from the output I/O modules.

18. A pair of redundant controllers according to claim 13, wherein the control areas of the backup controller determine the values of the state variables for the control areas based on the retrieved process output values of the corresponding output I/O modules.

19. A pair of redundant controllers according to claim 13, wherein the control synchronization program of the backup controller determines the values of the state variables for the control areas of the backup controller based on the retrieved process output values of the corresponding output I/O modules.

20. A method for performing a failover in a pair of redundant controllers in a process control network from one controller functioning as a primary controller to perform process control to another controller functioning as a backup controller, wherein each of the redundant controllers has a plurality of control areas each having a process control application program for performing process control functions, wherein each control area includes state variables that are used by the process control application program to perform the process control functions, that are updated when the control area executes to perform process control, and that is are stored at the controller and is are not transmitted to the other devices, wherein the control areas further include output I/O modules that format and transmit process control messages containing process output values used by corresponding controlled field devices to assume operational states determined by the process control application programs of the control areas, the method comprising:
  transmitting a primary controller failure message from the primary controller to the backup controller;
  determining whether a controller mismatch condition exists in response to receiving the primary controller failure message at the backup controller, wherein the controller mismatch condition exists when the redundant controllers are programmed with different configurations of control areas;
  retrieving process output values of the output I/O modules of the control areas of the primary controller in response to determining that the controller mismatch condition exists;
  determining at the backup controller values of the state variables for the control areas of the backup controller using the retrieved process output values of the output I/O modules of the control areas of the primary controller; and
  begin performing process control functions at the backup controller by executing the process control application programs of the control areas of the backup controller using the values of the state variables determined at the backup controller.

21. A method according to claim 20, comprising:
  storing a mismatch condition indicator at the backup controller;
  setting the mismatch condition indicator to a mismatch condition value when the mismatch condition exists; and
  determining whether the controller mismatch condition exists based on the value of the mismatch condition indicator.

22. A method according to claim 20, comprising:
  at the backup controller, receiving process control messages containing process output values of the output I/O modules transmitted over the process control network by the primary controller during the performance of process control functions;
  storing the process output values of the output I/O modules from the received process control messages at the backup controller; and
  retrieving the process output values of the output I/O modules of the control areas of the primary controller stored at the backup controller in response to determining that the controller mismatch condition exists.

23. A method according to claim 20, comprising:
  transmitting request messages from the backup controller to an I/O device communicatively linking the redundant controllers to the field devices for process output values of the output I/O modules stored at the hardware modules;
  at the backup controller, receiving response messages from the I/O device containing stored process output values from the output I/O modules.

24. A method according to claim 20, comprising:
  transmitting request messages from the backup controller to the field devices for values of the output I/O modules stored at the field devices;
  at the backup controller, receiving response messages from the field devices containing stored values from the output I/O modules.

25. A method according to claim 20, comprising determining at the backup controller values of the state variables for the control areas of the backup controller at the control areas of the backup controller.

26. A method according to claim 20, wherein each of the redundant controllers includes a control synchronization program, the method comprising determining at the backup controller the values of the state variables for the control areas of the backup controller at the control synchronization program of the backup controller.

27. A pair of redundant controllers in a process control network, wherein the redundant controllers are communicatively linked to each other and to other devices of the process control network by a bus, wherein the controllers and the devices transmit process control messages over the bus, each of the redundant controllers comprising:
  a plurality of control areas each having a process control application program for performing process control functions, wherein each control area includes state variables that are used by the process control application program to perform the process control functions, and that are updated when the control area executes to perform process control, and wherein the values of the state variables are stored at the controller and is not transmitted to the other devices; and a control synchronization program,
  wherein one redundant controller operates as a primary controller to perform process control by executing the process control applications of the control areas, and the other redundant controller operates as a backup controller, wherein the control synchronization program of the primary controller causes the primary controller to transmit a synchronization message to the backup controller after the process control application program of a control area executes to perform process control, the synchronization message containing the values of the state variables from the control area, wherein the control synchronization program of the backup controller receives the synchronization message and the backup controller updates the values of the state variables of a control area of the backup controller corresponding to the executed control area of the primary controller with the values of the state variables from the synchronization message in response to receiving the synchronization message at the backup controller, wherein the control synchronization program of the primary controller formats and causes the primary controller to transmit token messages to the backup controller at a frequency equal to the highest frequency of execution of a control area of the primary controller, the token messages including configuration information for the control areas of the primary controller, wherein the configuration information includes identification of the state variables for which values will be transmitted from the primary controller in synchronization messages, wherein the control synchronization program of the backup controller receives the token message and stores the configuration information from the token message at the backup controller, wherein, when the backup controller is powered up, the control synchronization program of the backup controller determines whether the backup controller has received synchronization messages containing values for all of the state variables of the primary controller identified in the token message as synchronization messages are received at the backup controllers, and wherein the backup controller transmits a backup ready message to the primary controller in response to determining that the backup controller received synchronization messages containing values for all of the state variables of the primary controller identified in the token message.

28. A pair of redundant controllers according to claim 27, wherein a controller mismatch condition exists when the controllers are programmed with different configurations of control areas, wherein the control synchronization program of the backup controller determines whether the controller mismatch condition exists when the backup controller is powered up, and wherein the control synchronization program causes the backup controller to transmit a request for a token message to the primary controller in response to determining that the controller mismatch condition exists.

29. A pair of redundant controllers according to claim 27, wherein the control synchronization program of the primary controller causes the primary controller to transmit token messages to the backup controller in response to the reconfiguration of the control areas of the primary controller.

30. A pair of redundant controllers according to claim 27, wherein the configuration information in the token message includes an identifier for each control area of the primary controller, the frequency of execution of each control area, and the number of state variables associated with each control area.

31. A method for initializing a backup controller of a pair of redundant controllers in a process control network wherein one controller of the pair functions as a primary controller to perform process control and another controller functions as a backup controller, wherein each of the redundant controllers has a plurality of control areas each having a process control application program for performing process control functions, wherein each control area includes state variables that are used by the process control application program to perform the process control functions, that are updated when the control area executes to perform process control, and that are stored at the controller and are not transmitted to other devices, wherein the primary controller transmits token messages including configuration information for the control areas of the primary controller, wherein the configuration information includes identification of the state variables for which values will be transmitted from the primary controller in synchronization messages, and wherein the primary controller formats and transmits a synchronization message with the values of the state variables from an executed control area after the process control application program of the control area executes to perform process control, the method comprising:

powering up the backup controller;

transmitting the token messages from the primary controller to the backup controller at a frequency equal to the highest frequency of execution of a control area of the primary controller;

receiving a token message from the primary controller at the backup controller;

storing the configuration information from the token message at the backup controller;

receiving synchronization messages transmitted by the primary controller at the backup controller;

updating the values of the state variables of the control areas of the backup controller corresponding to the executed control areas of the primary controller with the values of the state variables from the synchronization messages in response to receiving the synchronization messages at the backup controller;

determining whether the backup controller has received synchronization messages containing values for all of the state variables of the primary controller identified in the token message; and transmitting a backup ready message from the backup controller to the primary controller in response to determining that the backup controller received synchronization messages containing values for all of the state variables of the primary controller identified in the token message.

32. A method according to claim 31, wherein a controller mismatch condition exists when the controllers are programmed with different configurations of control areas, the method comprising:

determining whether the controller mismatch condition exists; and transmitting a request for a token message from the backup controller to the primary controller in response to determining that the controller mismatch condition exists.

33. A method according to claim 31, comprising transmitting a token message from the primary controller to the backup controller in response to the reconfiguration of the control areas of the primary controller.

34. A method according to claim 31, wherein the configuration information in the token message includes an identifier for each control area of the primary controller, the frequency of execution of each control area, and the number of state variables associated with each control area.

* * * * *

UNITED STATES PATENT AND TRADEMARK OFFICE
CERTIFICATE OF CORRECTION

| | |
|---|---|
| PATENT NO. | : 8,359,112 B2 |
| APPLICATION NO. | : 11/331886 |
| DATED | : January 22, 2013 |
| INVENTOR(S) | : Richard W. Kephart et al. |

It is certified that error appears in the above-identified patent and that said Letters Patent is hereby corrected as shown below:

In the Claims:

At Column 18, line 65, "filed" should be -- field --.

Signed and Sealed this
Ninth Day of December, 2014

Michelle K. Lee
*Deputy Director of the United States Patent and Trademark Office*